Oct. 11, 1960  C W. MUSSER  2,955,854
MONOPOD
Filed Oct. 7, 1957  2 Sheets-Sheet 1

INVENTOR.
C WALTON MUSSER
BY
W. E. Thibodeau, T. J. Lynch
& H. R. Johns

Oct. 11, 1960 C W. MUSSER 2,955,854
MONOPOD
Filed Oct. 7, 1957 2 Sheets-Sheet 2

INVENTOR.
C WALTON MUSSER

United States Patent Office 2,955,854
Patented Oct. 11, 1960

2,955,854

MONOPOD

C Walton Musser, Beverly, Mass., assignor to the United States of America as represented by the Secretary of the Army Filed Oct. 7, 1957, Ser. No. 688,789

3 Claims. (Cl. 287—58)

(Granted under Title 35, U.S. Code (1952), sec. 266)

The invention described herein may be manufactured and used by or for the Government for governmental purposes without the payment of any royalty thereon.

This invention relates to adjustable support devices, and has for its principal object the provision of an improved support device which (1) is of relatively simple construction, (2) is quickly extensible to approximate the length required, and (3) automatically reset itself for a fine adjustment of its final length.

These results are achieved by a device including a threaded support member, a plurality of balls and a pair of spring-connected members. In the operation of the device, the spring-connected members are pulled in opposite directions to compress the springs and permit free movement of the threaded support member. Upon their release, these members are moved by the tension of the springs to a position such that the balls engage the thread of the support member which is then extended by rotation of the spring-connected members.

The invention will be better understood from the following description when considered in connection with the accompanying drawings and its scope is indicated by the appended claims.

Referring to the drawings.

Figure 1:
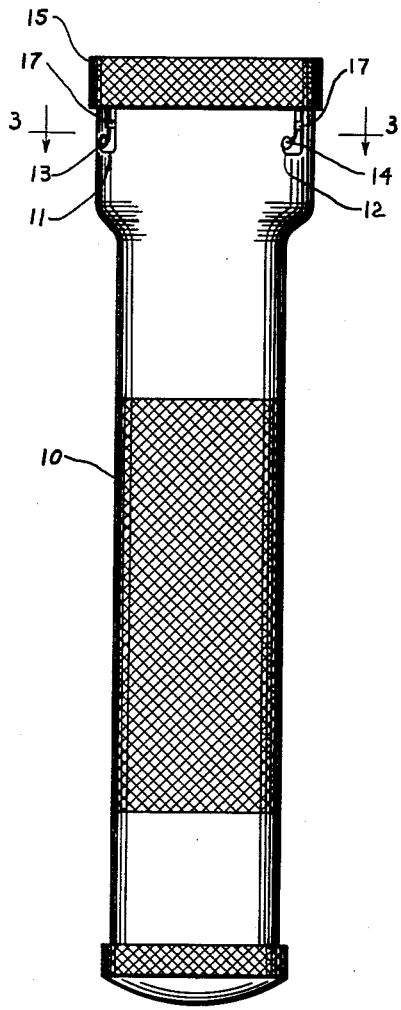
Fig. 1 is an outside view of the height adjusting device.
Figure 2:
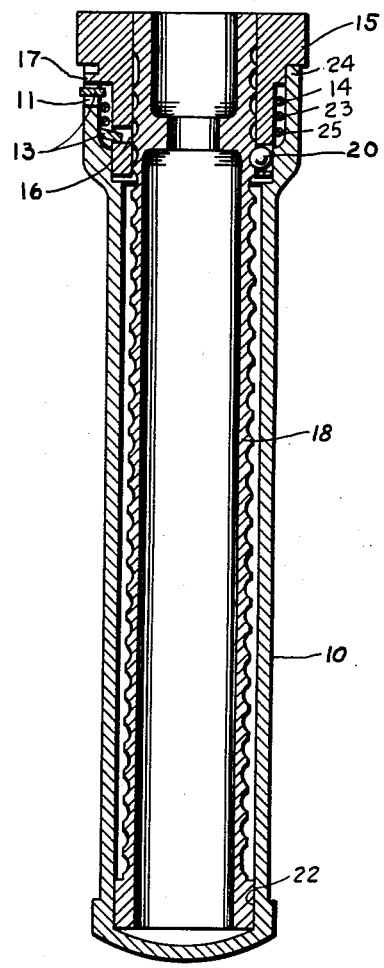
Fig. 2 is a longitudinal sectional view.
Figure 3:
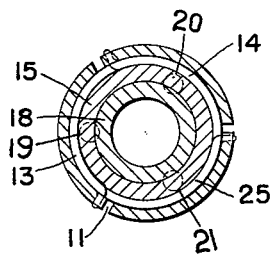
Fig. 3 illustrates a section taken in a plane 3—3 of Fig. 1.
Figure 4:
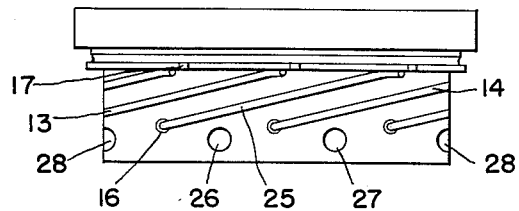
Fig. 4 is a developed side view of the cap 15, opened and laid flat.

Fig. 1 shows a handle 10 having bayonet-like slots 11 and 12 adapted to anchor the ends of springs 13, 14 and 25. These springs are connected between the handle 10 and a cap 15 and are so tensioned as to hold the cap and handle in contact with one another. Thus the spring 13 (see Fig. 1) has one of its ends in the slot 11 and the other of its ends in a slot 16 of the reduced section 23 of the cap 15. Three similarly disposed springs are spaced apart by 120 degrees around the periphery of the cap 15 each positioned in a slot in the handle and a slot in the cap. It will be noted that the cap 15 has teeth 17 which are positioned in the long part of slots 11 to prevent rotation of the cap with respect to the handle.

A member 18, adapted at its outer end to engage an object to be supported, is provided with a triple thread. Arranged to engage these threads are three balls 19, 20 and 21. These locking balls are supported in apertures 26, 27 and 28 near the inner end of the cap 15, and move away from their cooperating threads into the enlarged portion 24 of the handle 10 when the handle 10 is pulled away from the cap 15.

In the use of the device, a quick adjustment in its overall length is made by exerting between the handle 10 and the cap 15, a force whereby the springs are compressed and the balls 19, 20 and 21 are allowed to move radially outward into the enlarged part of the handle 10. The support 18 can then be moved to whatever position is desired within the limit set by the stop shoulder 22 at the bottom of the support member 18. At any position where the member 18 is stopped in its travel, the balls will engage the threads as the springs extended retract the cap into the handle. The handle can then be rotated, giving a vernier or screw-action adjustment of the support member, which may or may not be fixed to the object to be supported.

The device is readily disassembled by moving the tangs of the three springs into the long part of their respective slots. In this position, the entire unit pulls apart easily. In order to move the support member 18 into its fully retracted position it can be turned back or freed from the balls by extending the springs as previously indicated.

I claim:

1. The combination of a handle having an enlargement at one of its ends, a cap having a reduced portion adapted to be received in said enlargement, resilient means arranged between said cap and handle to force them longitudinally toward one another, a member having a thread on its outer periphery and extending from said handle through said cap for engaging an object to be supported, and locking means supported by said cap and arranged between said handle and said threaded member to engage said threaded member when said resilient means is retracted and to be radially moved outward disengaging said threaded member when said resilient means is extended.

2. The combination of a handle having an enlargement at one of its ends, a cap having a reduced portion adapted to be received in said enlargement, resilient means arranged between said cap and handle to force them longitudinally toward one another, a member having a thread on its outer periphery and extending from said handle through said cap for engaging an object to be supported, locking means supported by said cap and arranged between said handle and said threaded member to engage said threaded member when said resilient means is retracted and to be radially moved outward disengaging said threaded member when said resilient means is extended, and means for fixing said cap to said handle in a direction transverse to the longitudinal axis of said handle.

3. The combination of a handle having an enlargement at one of its ends, a cap having a reduced portion adapted to be received in said enlargement, resilient means arranged between said cap and handle to force them longitudinally toward one another, a member having a triple thread on its outer periphery and extending from said handle through said cap for engaging an object to be supported, and locking balls supported by said cap and arranged between said handle and said threaded member to engage said threads when said resilient means is retracted and to be radially moved outward disengaging said threaded member when said resilient means is extended.

References Cited in the file of this patent

UNITED STATES PATENTS

| 2,062,628 | Yannetta | Dec. 1, 1936 |
| 2,348,611 | Davidson | May 8, 1944 |

FOREIGN PATENTS

| 831,386 | Germany | July 8, 1949 |